Nov. 23, 1971   J. O. BILLUPS   3,621,549
CUTTING TOOL INSERT ASSEMBLY
Filed March 6, 1970   2 Sheets-Sheet 1

INVENTOR.
JAMES O. BILLUPS
BY
Pastoriza & Kelly
ATTORNEYS

United States Patent Office 3,621,549
Patented Nov. 23, 1971

3,621,549
CUTTING TOOL INSERT ASSEMBLY
James O. Billups, 1601 Oak Ave.,
Manhattan Beach, Calif. 90266
Filed Mar. 6, 1970, Ser. No. 17,150
Int. Cl. B26d 1/00
U.S. Cl. 29—96                                                 9 Claims

ABSTRACT OF THE DISCLOSURE

A tool holder to be used in place of a conventional tool holder is secured, for example, to the tool post of a machine lathe and appropriate settings of the machine may be made to define a given depth of cut and desired elevational work engaging position for a tool in the holder. A plurality of tool adapter members each having a seating surface defining a desired rake angle are provided together with a plurality of cutting tools each having different cutting nose radii, any one of the tools being receivable on any one of the adapter members. A selected tool and adapter member in accord with the desired nose radii of cut and rake angle are secured in the holder by a cooperating hold down means. The adapter members and cutting tools are dimensioned such that any one adapter member and any one cutting tool may be held in the tool holder to provide a desired rake angle and nose radius combination without changing the depth of cut, elevational engagement of the tool with the work, or any of the machine settings locating the tool holder. A cooperating chip breaker member designed for use with the cutting tool is also provided in the preferred embodiment.

---

This invention relates generally to machine tools and more particularly, to a novel cutting tool insert assembly for facilitating machine cutting operations on various types of work.

BACKGROUND OF THE INVENTION

In normal machine cutting operations; for example, trimming of a rotating cylindrical work on a lathe to provide a reduced diameter portion, a suitable cutting tool bit is secured in a tool post on the lathe. The depth of cut, the elevational position of contact of the tool with the work, and the rake angle are carefully adjusted by suitable settings provided in the machine so that the cutting nose portion of the tool is properly positioned.

If it is desired to change the cutting tool bit because a different type of bit having a different cutting nose radius is more desirable, the newly selected tool bit must be substituted for the tool bit in the tool holder. Once the new tool has been substituted, the settings must be readjusted if it is desired to maintain the previous depth of cut. These readjustments are necessary since only cutting tool bits with identical cutting nose radii are of identical interchangeable configuration.

If it is desired to change the rake angle of a cutting tool bit, the entire tool holder must be changed. Once the new tool holder has been changed the various settings must be readjusted in order to maintain the proper elevational position of contact with the work. These readjustments are necessary since each tool holder is configured independently of all other tool holders.

Substitution of a new cutting tool bit in present day tool holders is time consuming since a relatively delicate set screw or similar clamp structure must be loosened and then retightened. Of more significance, however, is the length of time required for readjusting all of the machine tool settings in order to maintain the desired depth of cut and elevational point of contact of the bit with the work when the rake angle is changed.

In addition to the foregoing, present machines usually include only one type of chip breaker or sloped edge surface functioning to break removed metal chips. This chip breaker sloped edge surface is normally at a fixed distance and fixed position relative to the cutting nose of a tool. When the rake angle or nose radius of the tool or the cross-sectional shape of the chip is changed in any way, the direction of departure and the characteristics of metal chips developed from the work will be different and the fixed type of chip breaker cannot thus function efficiently for all of the various tool bit arrangements. Dangerously long strings or curls of chips can result with the attendant risk of injuring the operator.

BRIEF DESCRIPTION OF THE PRESENT INVENTION

With the foregoing considerations in mind, the present invention contemplates the provision of a novel cutting tool insert assembly wherein the foregoing problems are substantially overcome.

More particularly, the invention provides a modified tool holder which may be secured in a conventional tool post in accordance with a desired elevational engaging position. A plurality of tool adapter members are provided, each having a seating surface defining a desired rake angle. Any one of these adapter members is receivable in the tool holder. A plurality of uniquely designed cutting tools in accord with the invention, in turn, are provided each having different cutting nose radii and each being receivable on the seating surface of a selected adapter member. A hold down means designed for cooperation with the unique tool holder secures the cutting tool and adapter member in a proper position to effect a desired elevational position of contact and once the machine adjustments have been effected, this elevational position of contact is maintained. The adapter members and cutting tools are dimensioned such that any one of the number of adapter members and any one of the number of cutting tools may be held in the tool holder to provide a different rake angle and nose radius combination without changing this elevational position of contact or without changing the depth of cut relationship between the machine and the work.

As a consequence of the foregoing arrangement, different rake angles and different cutting nose radii may readily be provided without having to effect any readjustments in the machine settings all to the end that cutting operations are greatly facilitated.

In accord with a further feature of the invention, a novel chip breaker member is provided for cooperation with the cutting tool and hold down means and is so designed as to provide several differently configured chip breaker clearances any one of which can be properly positioned for the particular combination of rake angle, depth of cut and cutting tool nose radius being used. Proper chip breaking is thus assured with the advantage of minimizing risk of injury.

BRIEF DESCRIPTION OF THE DRAWINGS

A better understanding of the invention will be had by now referring to one embodiment thereof as shown in the accompanying drawings in which.

3

Figure 1:
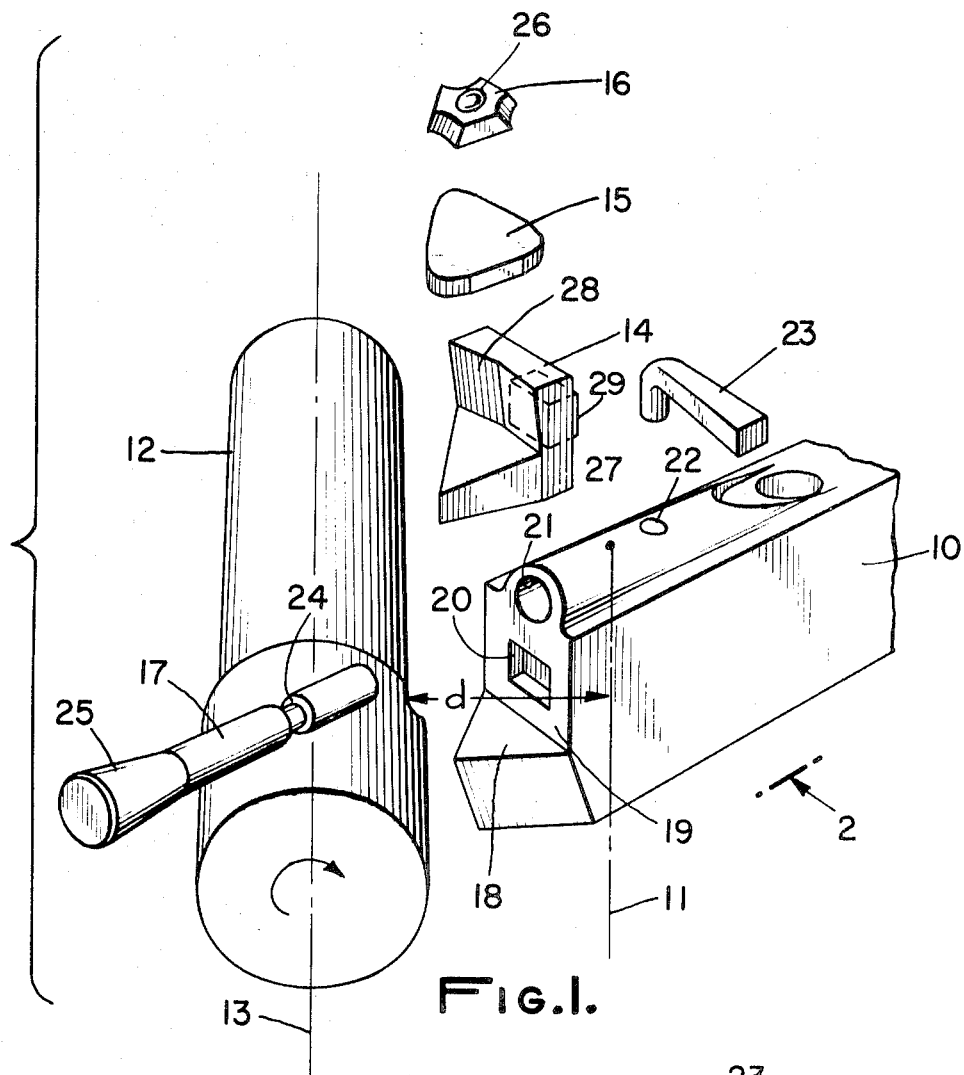
FIG. 1 is a schematic exploded perspective view illustrating the basic components of the cutting tool insert assembly in accord with the invention as might be used in a lathe.
Figure 3:
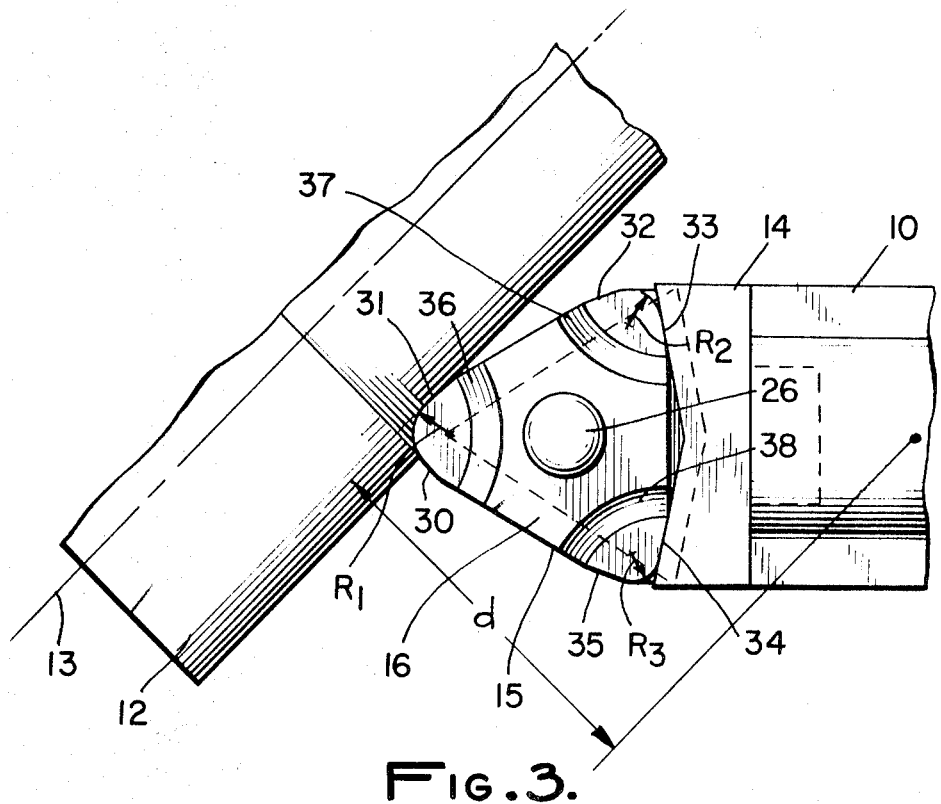
FIG. 3 is a top plan view with some parts in phantom lines taken in the direction of the arrows 3—3 of FIG. 2.
Figure 4:
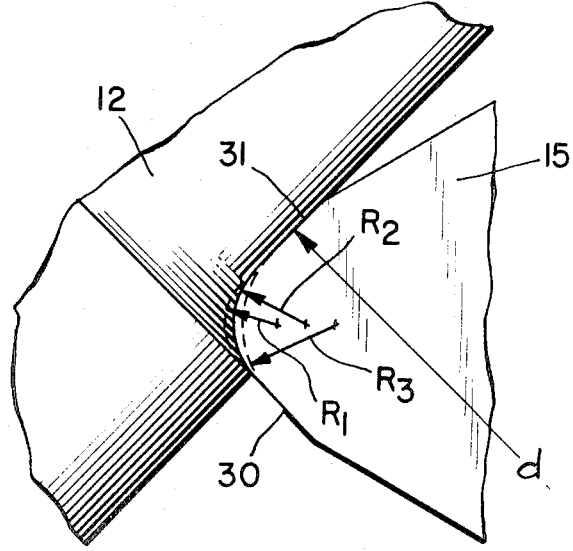
Figure 5:
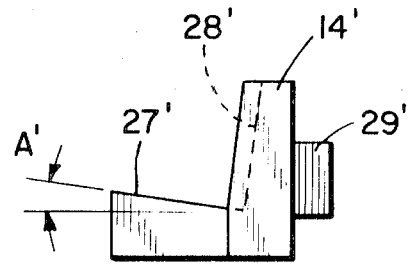

FIG. 4 is a greatly enlarged fragmentary view of a portion of the structure illustrated in FIG. 3; and FIG. 5 illustrates a modified component which may be substituted for the corresponding component in FIG. 1.

DETAILED DESCRIPTION OF THE INVENTION

Referring first to FIG. 1 there is shown a tool holder 10 for securement in a lathe accessory such as the conventional tool post (not shown) at a fixed distance as indicated by the fixed reference line 11 from a work 12 all in accordance with desired settings in the machine. The work 12 may comprise a cylindrical metal rod or bar stock mounted on the lathe for rotation about an axis 13 and the particular operation to be performed may be that of reducing a portion of the diameter of the rod. If a fixed distance between the reference line 11 for the tool holder 10 and the work is maintained such as indicated by the letter $d$, the depth of cut provided for any given one tool secured in the holder 10 will be constant.

In accord with the invention there are provided a plurality of generally L shaped tool adapter members and a plurality of generally triangular shaped cutting tools. Depending upon the desired rake angle and cutting nose radius for the cutting tool desired, a particular one of the adapter members is selected and a particular one of the triangular shaped cutting tools is selected. In FIG. 1 there is shown by way of example a selected adapter 14 and cooperating triangular shaped cutting tool 15. In addition, there is illustrated a chip breaker member 16 designed for cooperation with the cutting tool as will become clearer as the description proceeds.

The assembly is completed by a hold down means including a tapered pin 17 shown exploded from the tool holder 10.

Considering now the various components in greater detail, it will be noted that the tool holder 10 has a forward upper L shaped end portion to define seat and back surfaces 18 and 19. The back surface may include a recess 20 and at its upper portion a bore 21. A top opening 22 intercepts the bore 21 and is arranged to receive an eccentric wrench 23.

With the adapter member 14 positioned on the seating surface 18 of the tool holder, the cutting tool 15 seated on the surface 27 of the adapter member, and the chip breaker 16 on top of the cutting tool 15, the cylindrical portion of the tapered pin 17 may be inserted in the bore 21. As shown, the cylindrical portion of this tapered pin includes an annular groove 24 positioned to receive the eccentric end portion of the wrench 23 when the same is passed into the opening 22. The other end of the pin 17 includes a tapered head 25 in turn arranged to bear against a raised portion 26 formed on the top of the chip breaker 16 when the components are assembled. A downward camming force on the various components may thus be exerted by the tapered head 25 when the wrench 23 is rotated to cam the pin further into the bore 21.

With reference particularly to the adapter member 14, it will be noted that this member is of similar L shape to the upper front end portion of the tool holder 10 to define a modified seating surface 27 and back surface 28. Further, the adapter includes a rear projection 29 shown in phantom lines and constituting an integral part of the adapter. This projection 29 is receivable in the recess 20 at the back surface 19 of the tool holder for properly indexing the position of the adapter on the tool holder.

Figure 2:
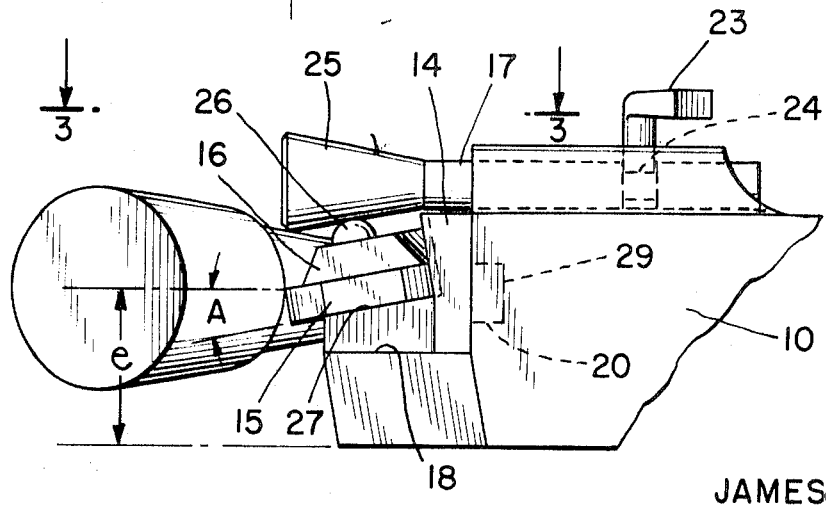
FIG. 2 is a side elevational view of the exploded components in assembled relationship looking generally in the direction of the arrow 2 of FIG. 1.

The foregoing assembly and the manner in which the hold down means in the form of the tapered pin operates will be clearer by referring to FIG. 2. In FIG. 2, the adapter member 14 is shown with its rear projection 29 positioned within the index recess 20 on the back surface of the tool holder 10. The particular adapter shown defines a given rake angle for the cutting tool 15, the plane of the triangular configuration of the cutting tool being parallel to the modified seat surface 27 of the adapter. This rake angle is indicated at A. Further, the elevational point of contact of the tool with the work can be maintained constant, this dimension being indicated by $e$, by proper dimensioning of the thickness of the bottom L shaped portion of the adapter member 14 taking into account the particular slope or rake angle defined by the adapter member.

The manner in which the tapered head portion 25 of the hold down pin 17 bears against the assembled components when urged to the right as viewed in FIG. 2 into the tool holder bore will be evident. The angle of taper of the pin head is such that a very secure, positive, and reliable holding of the assembled components is assured and yet the assembled components may very quickly be removed by loosening the pin with the wrench 23 and removing the same.

Referring now to the enlarged fragmentary plan view of FIG. 3 further details of the cutting tool itself and chip breaker as well as the cooperating adapter 14 will be evident. In the particular example of FIG. 3, the triangular shaped cutting tool 15 is shown with three different radii of curvature at its respective three vertices to illustrate the constant vaue of $d$ in FIG. 1. Thus the particular cutting vertex has a radius of curvature designated R1, the remaining vertices having radii of curvature of R2 and R3 respectively.

Each of the vertex curvatures merge into flats such as indicated at 30 and 31 for radius R1, 32 and 33 for the radius R2, and 34 and 35 for the radius R3. Each of the flats forms a fixed angle with the respective sides of the triangular configuration. With this arrangement, it is possible to have a flat such as the flat 31 associated with the cutting nose radius R1 indexed against the work 12 such that the flat is essentially parallel to the axis of rotation of the work 13. The back surface of the adapter 14 in turn is of a hollow V configuration so designed that it will engage in full surface contact respecttively the flat 33 and 34 associated with the remaining vertices. This full surface engagement is shown for the back surface portion 28 and flat 33. Further, by providing the symmetrical nonengaged flats 30, 32, and 35, the triangular shaped cutting tool may be rotated 120° to position any one of the remaining two vertices in cutting relationship to the work, these flats assuring that the depth of cut will remain the same even though a different cutting tool nose radius is employed, the fixed distance $d$ from the flat to the reference line 11 being constant for any position of the cutting tool.

In FIG. 3 there is also shown in plan view the chip breaker 16 lying on top of the cutting tool 15. This chip breaker member is of triangular configuration and is similarly oriented in position on top of the cutting tool. The vertices of the chip breaker terminate in concave cut-outs of different chip clearances to chip breaking edge slopes 36, 37, and 38 respectively. The chip breaker member itself may be rotated in 120° steps to provide different chip clearances to breaking edge slopes for cooperation with different nose cutting radii and chip cross-sectional characteristics.

FIG. 4 illustrates in even greater detail the manner in which a different nose radius cut may be provided without changing the depth of cut; that is, without changing the fixed distance $d$. As shown, the flat 31 engages the work 12. The extreme vertex portion of the tool 15 on the other hand may be designed with different radii than the radius R1. For example, a larger radius of curvature can be provided as indicated by the dotted line of radius R' or a smaller radius of curvature may be provided as indicated by the dotted line of radius R" all without changing the geometry of the flat 31.

It should be understood that while the particular cutting tool 15 described in FIG. 3 has been shown with vertices of different radii of curvature, the cutting tool could be entirely symmetrical with the three vertices having identical radii of curvature. The tool could then be used with one vertex in cutting position and when this cutting vertex became worn, the tool could be rotated 120° to position the next cutting vertex in cutting relationship, and so forth. To change the cutting radius, a completely different triangular shaped cutting tool having sides and flats identical to that of FIG. 3 but of different cutting nose radius of curvature could simply be substituted for the tool 15 all again without changing the depth of cut. Similar remarks apply to the chip breaker.

FIG. 5 shows another adapter member 14' similar to the adapted 14 except that its seating surface has a different slope to define a positive rake angle. This seating surface is indicated at 27' and the rake angle is indicated at A'. The back surface 28' is properly oriented relative to the inclination of the seat surface 27' to receive in full surface engagement the flats of the cutting tool when the cutting tool is positioned on the surface 27'. The seating surface could be sloped in other planes to vary the rake angle as measured parallel to the axis of the work By simply substituting the different adapter member 14' for the member 14 described in FIGS. 1, 2 and 3, a different rake angle is provided and yet, the dimensioning of the adapter is such as to assure that the depth of cut will still be constant and that the elevational point of contact will remain the same.

OPERATION

The operation of the cutting tool insert assembly will be readily apparent from the foregoing description.

Initially, the tool holder 10 of FIG. 1 is secured within a tool post or other fixture on the machine. An adapter member 14 is then selected from a plurality of such members providing the desired rake angle of cutting and a desired cutting tool 15 is selected depending upon the particular type of cutting nose radius desired. These components are then assembled with the chip breaker 16 properly oriented for the selected chip cross-sectional configuration for optimum chip breakage operation in the L-shaped upper forward portion of the tool holder 10. The pin 17 is then inserted in the bore 21 and tightened by the wrench 23 as described in conjunction with FIG. 2 to positively hold the assembled components in their set positions. In this respect, the flats of the vertices of the cutting tool seat against the shallow V back surfaces of the adapter as described the remaining vertex being positioned for a cut.

After the components have been assembled, the various settings on the machine are adjusted to position the tool holder 10 for a desired depth of cut and elevational contact with the work.

The cutting operation may then begin. At any time during the cutting operation, if it is desired to change the nose radius of the cutting tool or the rake angle, suitable substitute cutting tools or adapter members may readily be positioned in the tool holder 10 and the cutting continued without having to effect any changes in the machine settings. Further, because of the dimensioning of the cutting tools and adapters as described, the depth of cut and elevational point of contact will remain constant.

Finally, the chip breaker member 16 may be oriented to position the edge slope best configured for the particular operation taking place.

It will thus be evident that the present invention has provided a cutting tool insert assembly which obviates various time consuming operations heretofore necessary in the operation of cutting machine tools all to the end that cutting operations are greatly facilitated, can be carried out in less time, and as a result far more economically than heretofore possible.

What is claimed is:

1. A cutting tool insert assembly for a machine, including, in combination:
    (a) tool holder means for securement in said machine at a fixed relationhip with a work in accordance with a desired depth of cut; and
    (b) a cutting tool held by said tool holder means, said cutting tool being of equilateral triangular configuration, the vertices having different radii of curvature and merging into flas forming a given fixed angle with respect to the sides of said triangular shape respectively, such that the flat associated with a particular cutting vertex of the tool indexes the tool against the work when the remaining flats are in surface engagement with said tool holder means so that the tool may be repositioned with a vertex of different curvature positioned for cutting its associated flat indexing the work so that a constant depth of cut even though of different radius is assured without requiring readjustment of said tool holding means.

2. An assembly according to claim 1, in which said tool holding means includes a tool holder, cooperating adapter member, and a hold down means, said hold down means securing said cutting tool on said adapter member and to said tool holder, said adapter member defining the rake angle of said tool and being interchangeable with other adapter members to define different rake angles without altering the depth of cut or elevational point of contact of the cut on the work.

3. A cutting tool insert assembly for a machine, including, in combination:
    (a) a tool holder for securement in said machine with a fixed relationship with a work in accordance with a desired depth of cut and elevational engaging position;
    (b) a plurality of tool adapter members each having a seating surface defining a desired rake angle;
    (c) a plurality of cutting tools each having different cutting nose radii receivable on said seating surface; and
    (d) hold down means cooperating with said tool holder for securing a selected one of said adapter members and selected one of said cutting tools to said tool holder, said adapter members and cutting tools being dimensioned such that any one adapter member and any one cutting tool may be held in said tool holder to provide a desired rake angle and nose radius combination without changing the depth of cut, elevational engagement of the tool with the work, or any of the machine settings positioning said tool holder.

4. An assembly according to claim 3, in which each cutting tool is of triangular configuration, any vertex portion of which may be positioned for cutting operations, the remaining two vertex portions engaging the associated adapter member.

5. An assembly according to claim 4, including a chip breaker member of triangular configuration terminating in concave cut-outs of different curvatures and defining breaking edge slopes, said chip breaker member being receivable on top of and holdable with said cutting tool by said hold down means and rotatable in 120° steps to assume similar orientation with said cutting tool so that any one of the three chips breaking edge slopes may be positioned for cooperation with the selected cutting vertex portion of the cutting tool.

6. A cutting tool insert assembly for a machine comprising, in combination:
    (a) a tool holder for securement in said machine with a fixed relationship with a work in accordance with desired settings in said machine, said holder having a forward upper L shaped end portion defining seat and back surfaces;
    (b) a plurality of L shaped tool adapter members any one adapter member being receivable on said seat and back surfaces and defining, in turn, a modified seat and back surface, said modified seat surface being sloped to define a desired rake angle;
    (c) a plurality of cutting tools of triangular configuration, the vertices having different radii of curvature, any one tool being receivable on said modified seat surface with the plane of the triangular configuration being parallel to the plane of said modified seat surface;

(d) a chip breaker member of triangular configuration, the vertices terminating in concave cut-outs of different curvatures and defining chip breaking edge slopes, said chip breaker member being receivable on top of said cutting tool in similar orientation thereto; and (e) hold down means cooperating with said tool holder to exert positive force on said chip breaker, cutting tool, and adapter member to hold them in said forward L shape end portion, said cutting tools and adapter members being dimensioned such that substitution of different ones in said forward L shaped end portion enables the rake angle and nose radius of a cut to be changed without changing the depth of cut, the elevation point of contact, or the position of said tool holder as determined by the settings in said machine.

7. An assembly according to claim 6, in which said tool holder includes a bore extending normally into its back surface at said forward portion above said chip breaker, said hold down means comprising a tapered pin receivable in said bore, the head portion of said pin camming said chip breaker towards said seat surface as said pin is moved into said bore.

8. An assembly according to claim 6, in which the radii at the vertices of said cutting tool merge into flats forming a given fixed angle with respect to the sides of said triangular shape respectively, the flat associated with the particular cutting vertex of the tool indexing the tool against the work to assure a constant depth of cut even though a different nose radius is provided when a different cutting vertex is positioned for use.

9. An assembly according to claim 8, in which the modified back surface of said adapter member defines a shallow V shape to engage in full surface contact the remaining two flats on said cutting tool.

References Cited

UNITED STATES PATENTS

| | | | |
|---|---|---|---|
| 2,289,344 | 7/1942 | Cedarleaf | 29—102 |
| 2,903,781 | 9/1959 | Hudson | 29—96 |
| 2,949,662 | 8/1960 | Cook et al. | 29—96 |
| 3,289,272 | 12/1966 | Stier | 29—96 |
| 3,500,523 | 3/1970 | Cashman et al. | 29—96 |

HARRISON L. HINSON, Primary Examiner

U.S. Cl. X.R.

29—98